A. NEWBROUGH.
GATE-LATCHES.
No. 194,166. Patented Aug. 14, 1877.
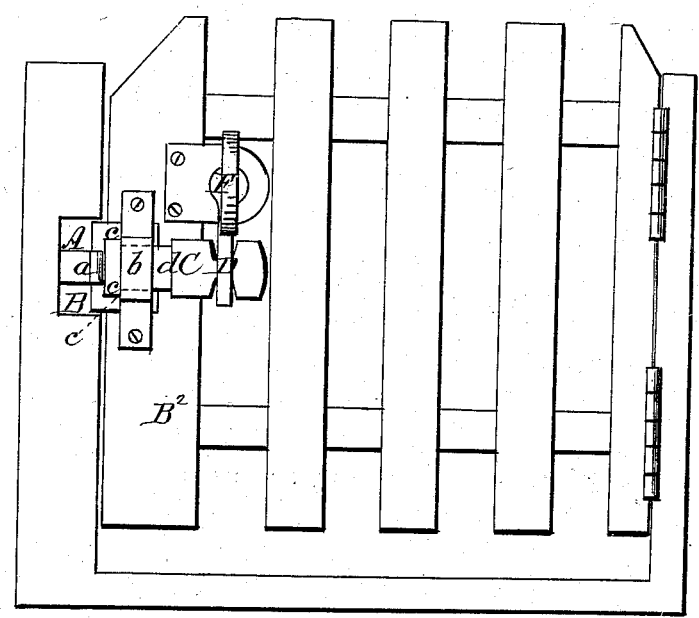
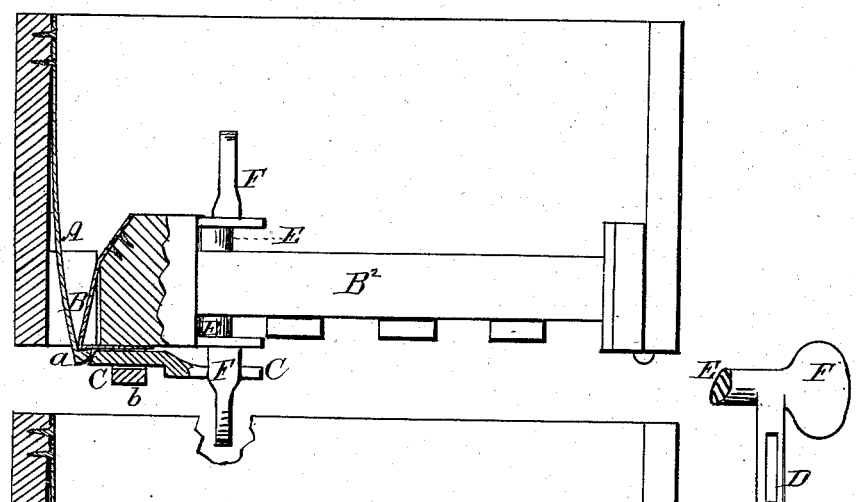
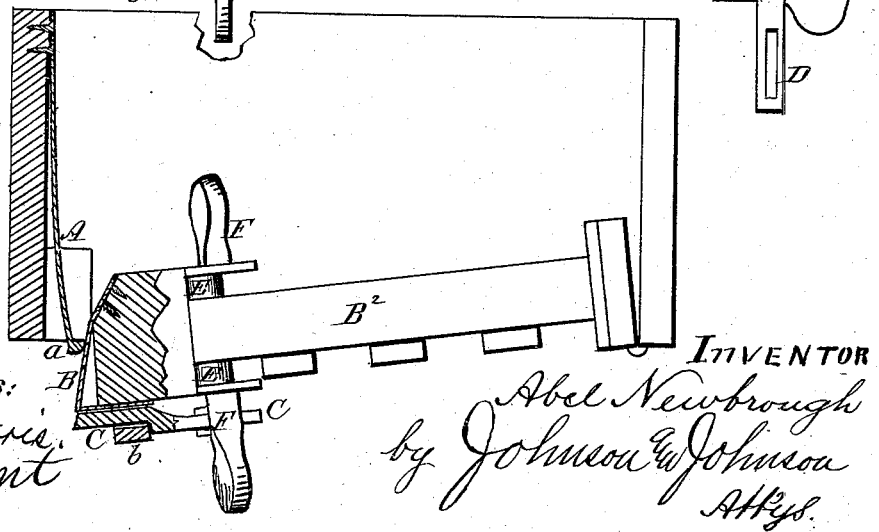
Witnesses:
Floyd Jarris
R. C. Grant
Inventor
Abel Newbrough
by Johnson & Johnson
Att'ys.

UNITED STATES PATENT OFFICE.

ABEL NEWBROUGH, OF MADISONVILLE, KENTUCKY.

IMPROVEMENT IN GATE-LATCHES.

Specification forming part of Letters Patent No. 194,166, dated August 14, 1877; application filed July 6, 1877.

*To all whom it may concern:*

Be it known that I, ABEL NEWBROUGH, of Madisonville, in the county of Hopkins and State of Kentucky, have invented certain new and useful Improvements in Gate-Latches; and I do hereby declare that the following is a full, clear, and exact description thereof, which will enable others skilled in the art to which it appertains to make and use the same, reference being had to the accompanying drawings, and to the letters of reference marked thereon, which form a part of this specification.

A spring-catch on the post is adapted to ride over and catch with a face-plate on the gate, and to fasten it when closed. A slide or push bar, and a double thumb-stem connected therewith, and both carried by the gate, are combined for action with the spring-catch, in such a manner that the slide or push bar will be contiguous to and in line with the holding end of the spring-catch, and, when projected by turning its connected thumb-stem, will act upon and push the spring-catch in and off the face-plate, so that the gate can be opened.

The closing of the gate brings the spring-catch over the end of the slide or push bar, and forces it back in position to act when the thumb-stem is turned to unfasten the gate. For this purpose the spring-catch and the slide or push bar are at right angles to each other when the gate is fastened, and the thumb-stem has a link or arm connection with the slide. This latch device renders the fastening certain when the gate is closed, and gives a convenient means for unfastening the gate from either side, in the manner of a double knob-latch, and by a simple and cheap construction.

Referring to the drawings, Figure 1 represents an elevation of the gate closed and fastened by my improved latch device; Fig. 2, a horizontal section of the same; Fig. 3, a similar section, the gate being partially opened.

A spring-bar, A, having a catch, $a$, at its end, is fastened, in any suitable way, to the gate post or pillar, so that the catch $a$ stands out in position to be struck by an angular face-plate, B, on the gate $B^2$, and over which plate the catch rides and fastens when the gate is closed.

The spring-catch constantly presses against the end of the gate when closed, and must be pressed inward away from the gate to open the latter. This is effected by a slide or push bar, C, fitted to work in a guide, $b$, on the side of the gate, so that the end of said slide, when the gate is closed, will be in line with and abut against the end $a$ of the spring-catch, and when pushed out will move the latter in, and free it from the gate face-plate B, to open the gate. The spring crosses the end of the gate to fasten it, and the push-bar is at right angles to the spring-catch, and in position to act upon it when the gate is closed.

The slide or push bar is connected at its inner end to an arm, D, of a thumb-stem, E, secured to the gate in bracket-bearings, so that when turned by its thumb-holds F F the arm D will force the slide out against and release the catch. The latching of the gate forces the slide or push bar back by the pressure of the spring-catch upon the end of the slide. This movement is limited by shoulders $c\ c$ on the slide in front of the guide $b$, while a shoulder, $d$, in rear of the guide limits the projection of the slide to unfasten the spring-catch.

The thumb-stem arm D and the slide C may be connected by pin and slot or pivot, or in any suitable way.

The ends of the catch $a$ and of the slide C are beveled correspondingly, as shown in Figs. 2 and 3, so that in projecting the slide its beveled end will act upon the beveled end of the spring-catch in a manner to throw it off the face-plate, and, in doing so, to start the gate and have it free to be opened. This is an important advantage, as it gives certainty in unfastening the gate.

The gate is hinged, and is opened by turning the thumb-hold on either side to move out the slide, and push away the latch end of the spring-bar to free it from the gate.

The spring-catch can be easily set out or in to suit the gate, as required.

I claim—

1. In a gate-latch, the slide C, connected by a free joint to the arm D of the thumb-stem E, and combined with a gate face-plate, B, and the post spring-catch A $a$, all as shown and described.

2. The projecting gate face-plate B, the beveled end of the spring-catch, and the beveled end of the slide or push bar, combined for use as described.

3. The push-bar provided with the shoulders $c\ c\ d$, in combination with the guide $b$, the spring-catch A $a$, and the thumb-stem connecting-arm D, all as herein set forth.

In testimony that I claim the foregoing I have affixed my signature in the presence of two witnesses.

ABEL NEWBROUGH.

Witnesses:
   WM. H. HALL,
   M. W. BISHOP.